Inventor:
Kurt Laas.
By [signature] Atty.

Sept. 11, 1962

K. LAAS

BATTERY FEED FOR TELEPHONE LINES ACCESSIBLE TO CONNECTORS 3,053,937

Filed March 6, 1959

7 Sheets-Sheet 2

Inventor
Kurt Laas
By [signature] Atty.

Inventor:
Kurt Laas
By [signature]
Atty.

Sept. 11, 1962

K. LAAS 3,053,937

BATTERY FEED FOR TELEPHONE LINES ACCESSIBLE TO CONNECTORS

Filed March 6, 1959

7 Sheets-Sheet 4

Inventor.
Kurt Laas.
By. [signature] Atty.

Sept. 11, 1962

K. LAAS 3,053,937

BATTERY FEED FOR TELEPHONE LINES ACCESSIBLE TO CONNECTORS

Filed March 6, 1959

7 Sheets-Sheet 5

Inventor.
Kurt Laas.
By [signature] Atty.

Inventor.
Kurt Laas.
By [signature] Atty.

Sept. 11, 1962 | K. LAAS | 3,053,937
BATTERY FEED FOR TELEPHONE LINES ACCESSIBLE TO CONNECTORS Filed March 6, 1959 | 7 Sheets-Sheet 7

Inventor:
Kurt Laas.
By [signature] Att'y

3,053,937
BATTERY FEED FOR TELEPHONE LINES ACCESSIBLE TO CONNECTORS

Kurt Laas, Munich, Germany, assignor to Siemens & Halske Aktiengesellschaft Berlin and Munich, a corporation of Germany Filed Mar. 6, 1959, Ser. No. 797,812
Claims priority, application Germany Mar. 10, 1958
7 Claims. (Cl. 179—18)

This invention relates to a circuit arrangement for providing battery feed for subscribers' lines accessible to connectors, in communication systems and particularly telephone systems.

The circuit arrangement according to the invention provides means for testing a line accessible to a connector, to ascertain whether the line is idle or busy. The switching means for the testing of a line reached by a connector, such as testing relays, are disposed in the connector in accordance with known technique; after the connector has been set by current impulse series transmitted from a calling party, with its wipers in engagement with the bank contacts of a desired called line, the testing circuit is closed for a predetermined testing interval. If the testing relay fails to operate within this testing interval, busy tone will be transmitted to the calling subscriber so as to cause him to replace the receiver, whereupon the connection is released.

These testing switching means are utilized only during the extension of calls, and since they are provided in each connector, their number is very great. The object of the invention is to reduce the number of testing switching means required and at the same time to simplify the connector. This object is realized by the invention by the provision of a battery feed transmission disposed ahead of the connector and containing switching means for the testing and for the connection of battery feed current to the called line, such battery fed transmission being seized by the connector after the setting thereof, by as seizure criterion rearwardly transmitted thereto.

The invention thus effects seizure of the test relay set and, accordingly, switching-in of the test switching means, only after the connector has been set to the desired called line, whereupon such line is tested for its idle or busy condition. Therefore, no particular criteria are during the extension of a call required for switching in such relay set which will be referred to as feed transmission. Wrong connections cannot result since the impulse conductor is in normal position of the feed transmission directly connected through, thus preventing mutilation of current impulse series during the seizure of the feed transmission. The arrangement of the feed transmission according to the invention is not only applicable in the case of telephone systems provided with centrally disposed setting sets, as shown in the illustrated example, but may be equally advantageously used in connection with telephone systems in which the switches for extending calls are controlled by impulse series directly transmitted from calling subscriber stations.

Figure 1A:
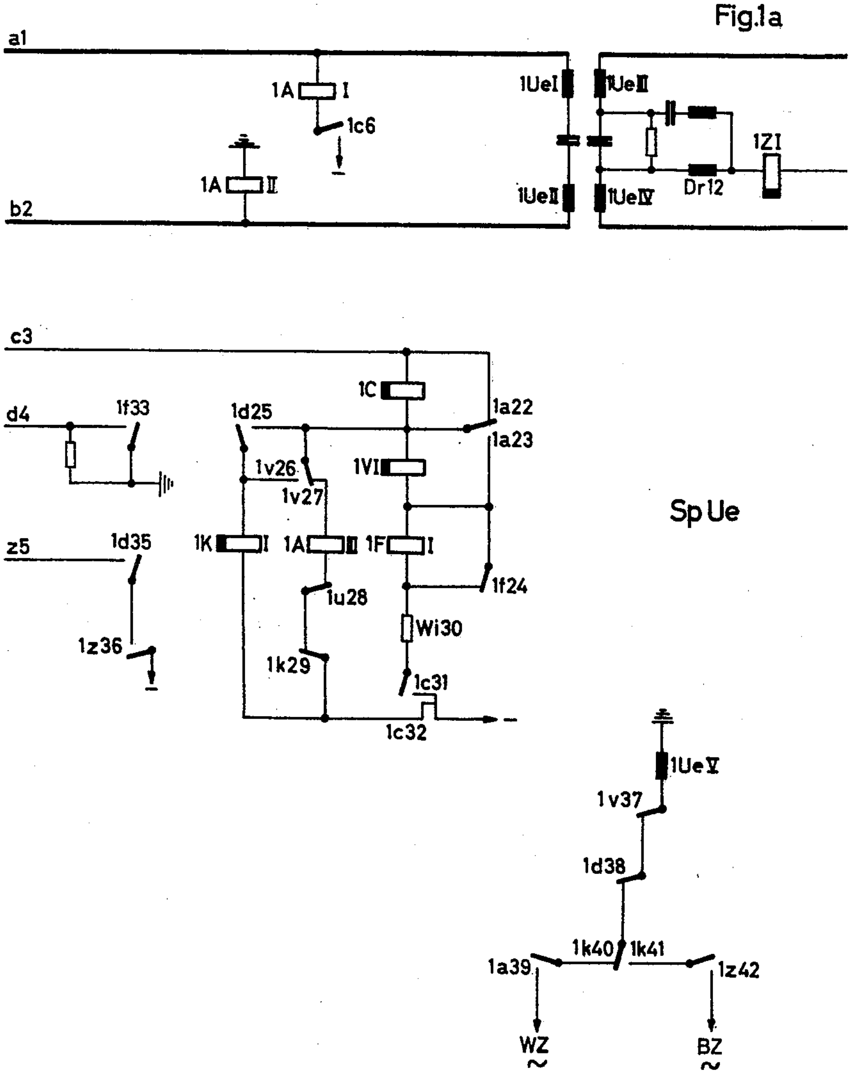
Figure 1B:
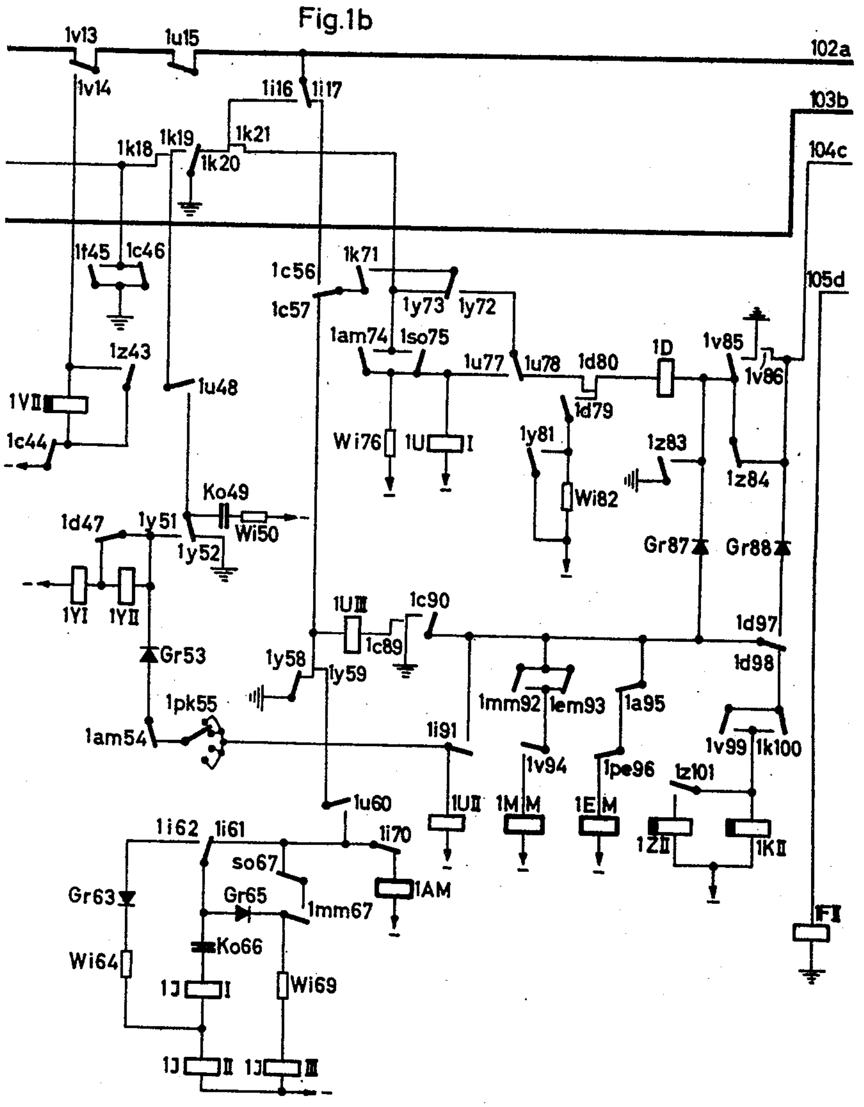
Figure 2A:
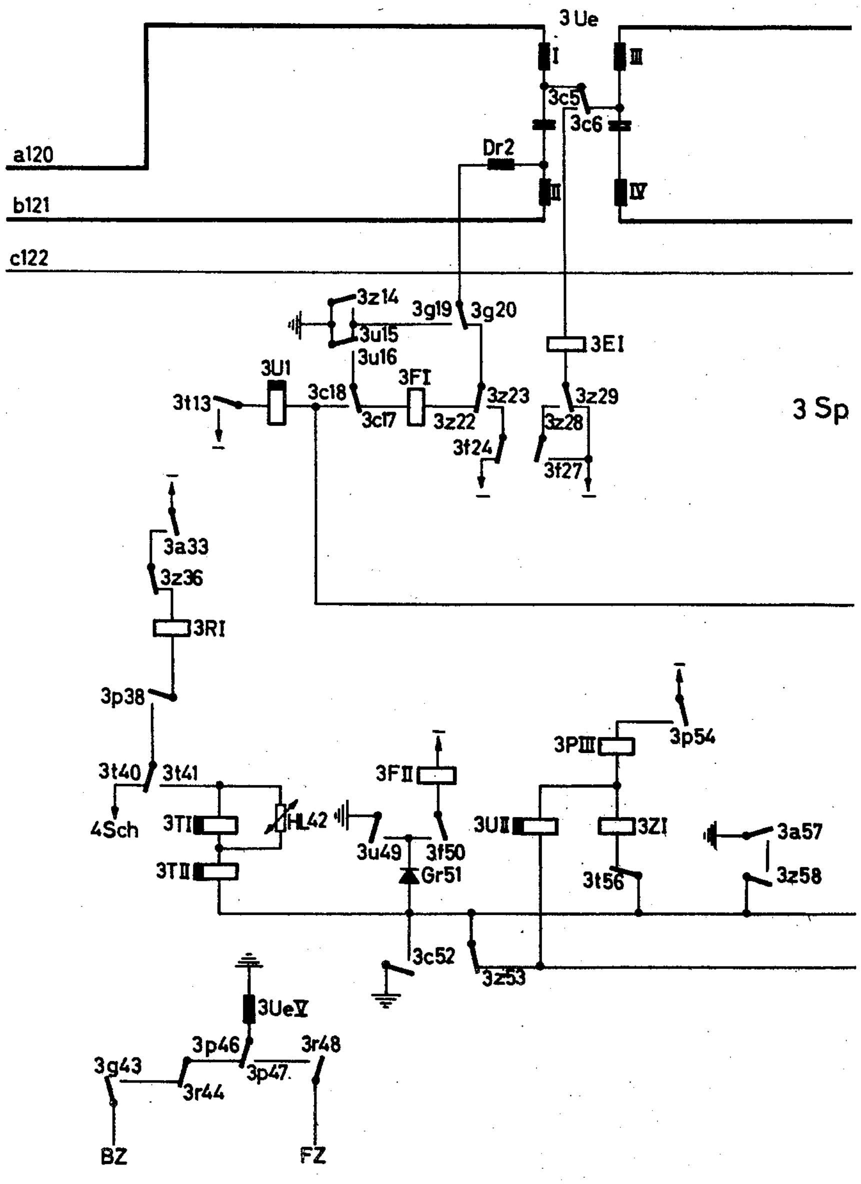
Figure 2B:
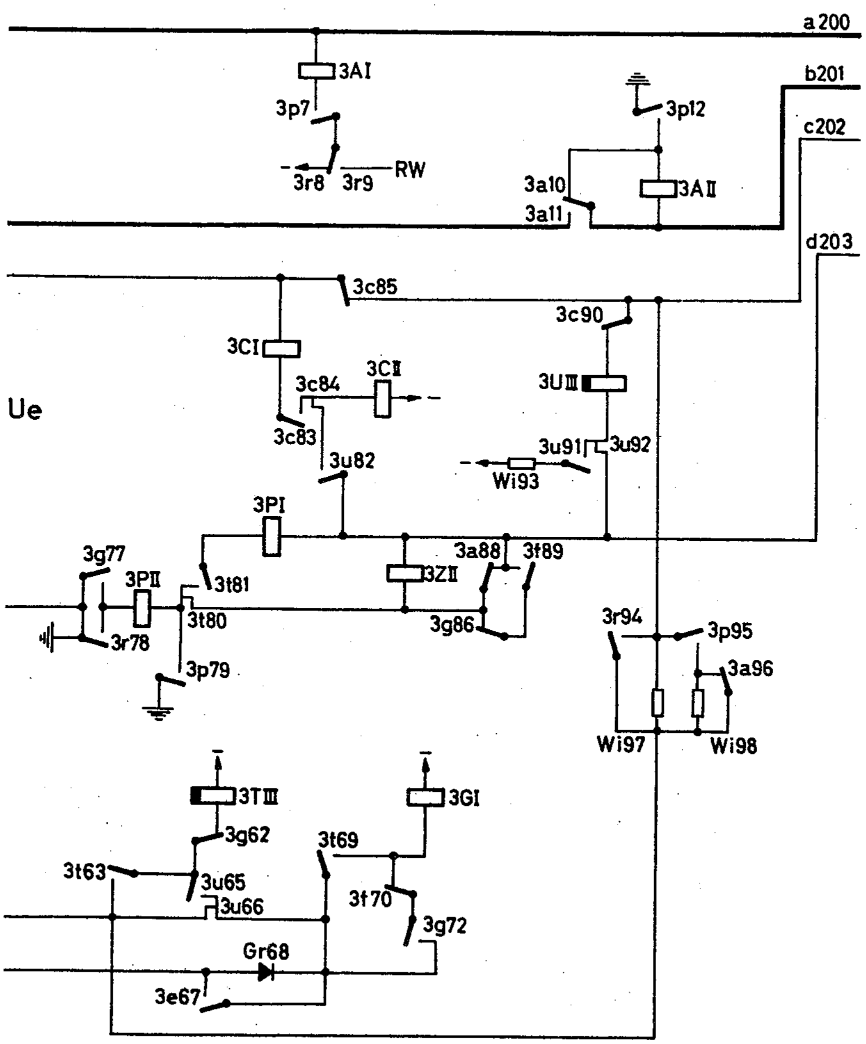
Figure 3A:
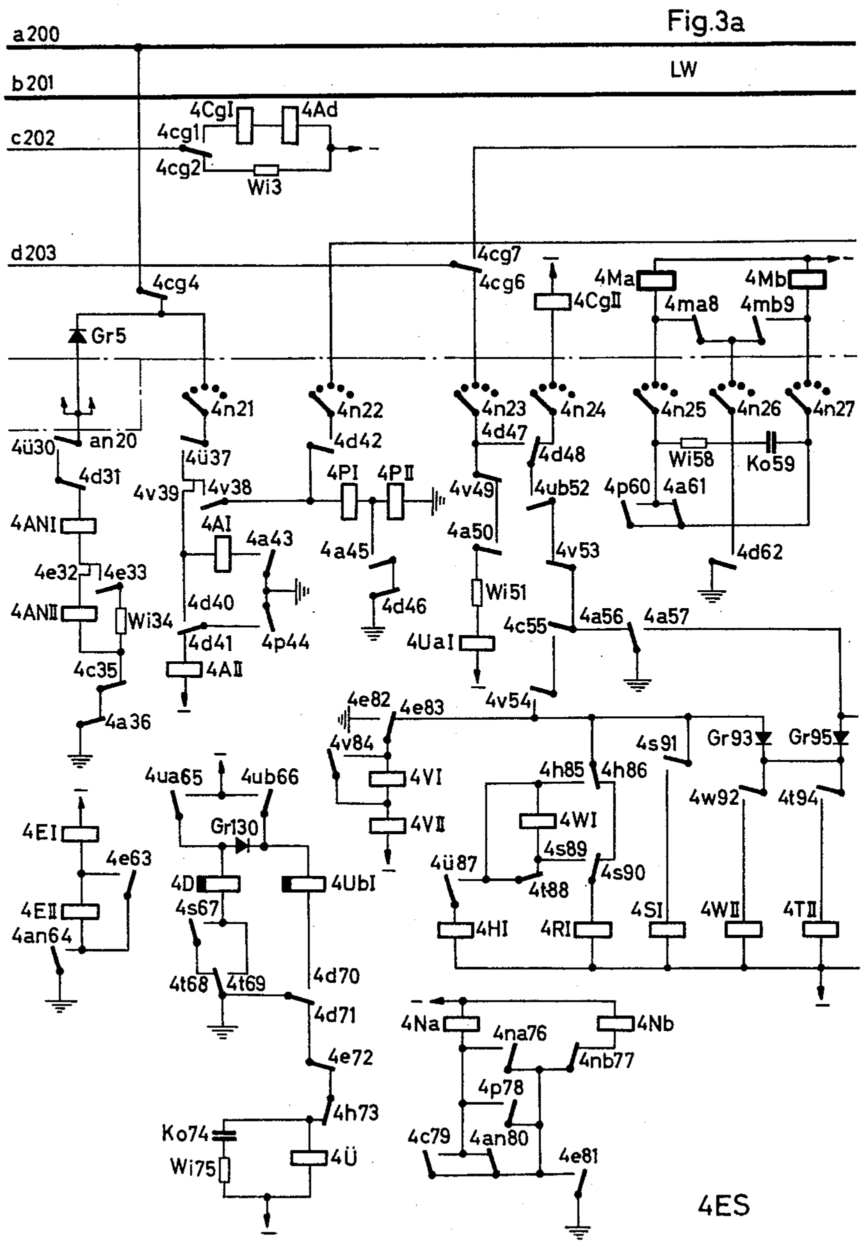
Figure 3B:
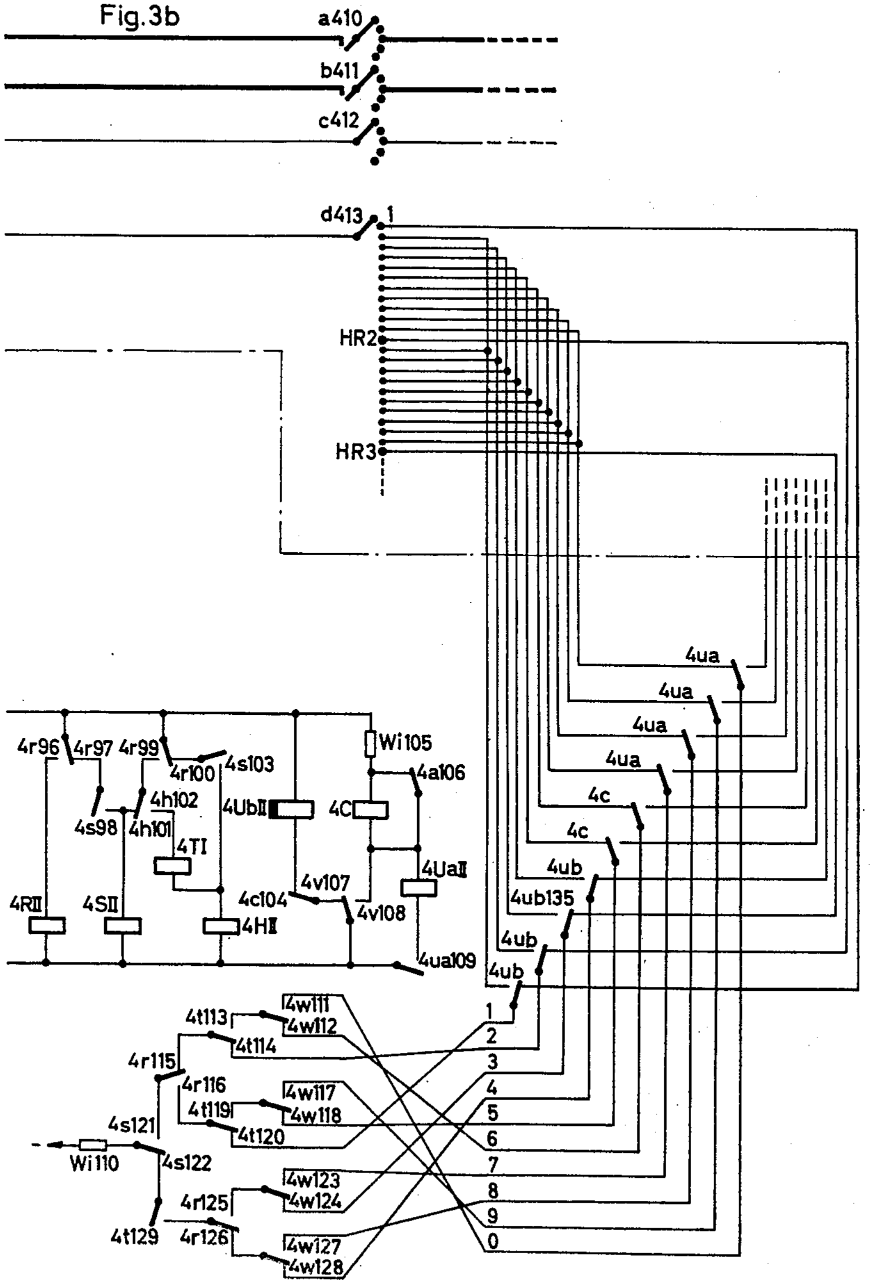
Figure 4:
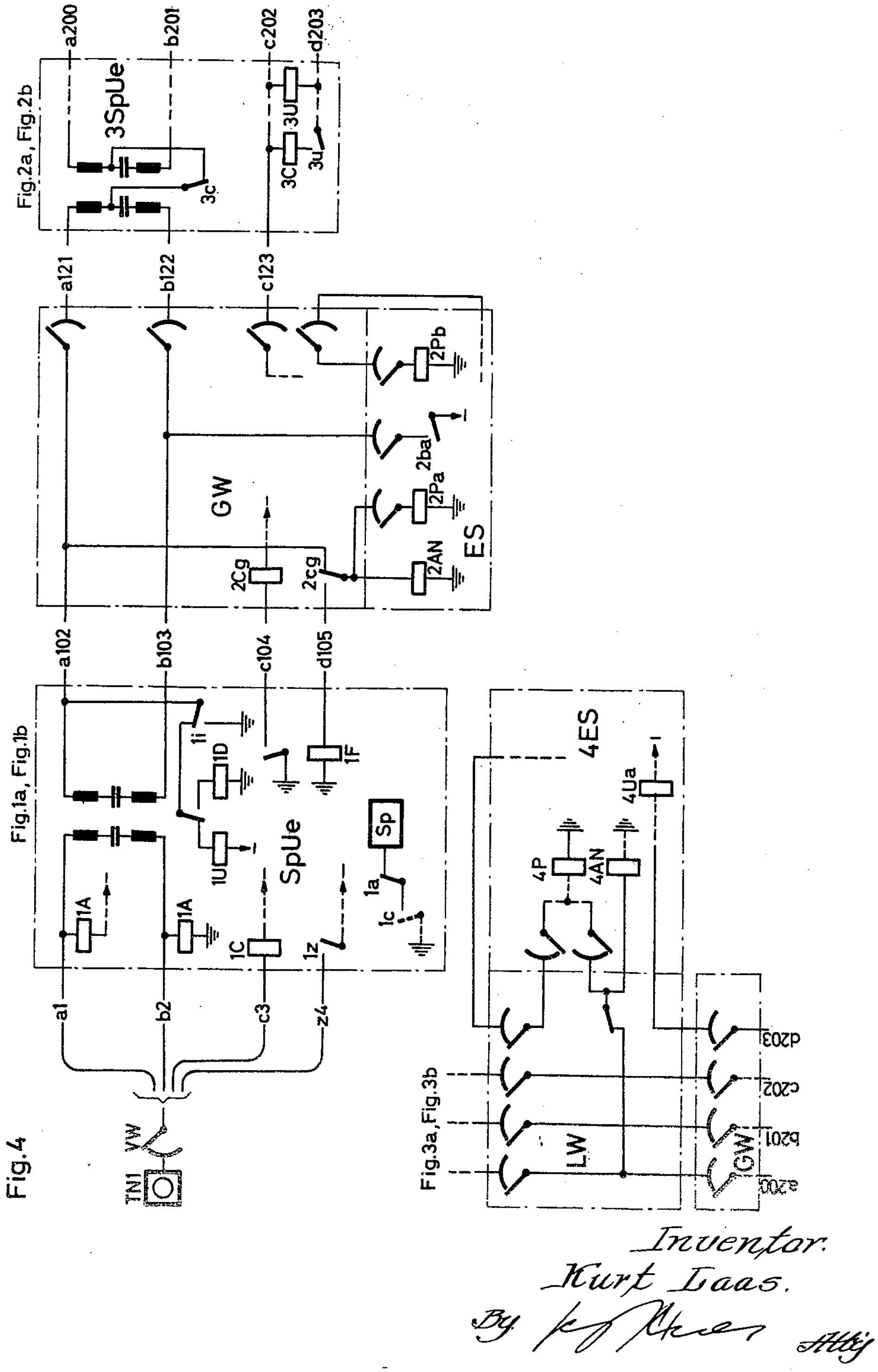

The various objects and features of the invention will appear in the course of the description which is rendered below with reference to the accompanying drawings showing an embodiment of a telephone system having switches which are set by setting sets respectively common to a plurality of switches. In the drawings, FIGS. 1*a* and 1*b* show a storing device incorporated in in such a system and arranged in the feed transmission for the calling subscriber;

FIGS. 2*a* and 2*b* show the feed transmission 3*Sp*U*e* comprising the test switching means for the called line reached by a connector;

FIGS. 3*a* and 3*b* illustrate the connector and a setting set which is common to a plurality of connectors; and FIG. 4 is an overall circuit representation of the telephone system serving as an example.

FIG. 4 will be discussed first so as to explain the operation of the telephone selection system, details of which are shown in the remaining FIGS. 1*a* to 3*b*.

The individual subscriber stations, such as, for example, station TN1 are connected to bank contacts of a call finder VW which is directly connected with a feed transmission *Sp*U*e*. As soon as a subscriber removes his receiver, a call finder starts to operate and establishes connection with such subscriber to extend the calling line to the feed transmission. The current impulse series transmitted by the calling subscriber by impulsewise interruption of the line loop cause impulsewise actuation of the line relay 1A which transmits the impulses to the storer S*p* arranged in the feed transmission. Upon receipt of the first impulse, voltage is placed on the outgoing conductor *a*102, causing energization of the start relay 2AN in the setting set ES which is common to a plurality of group selectors GW, such start relay 2AN starting operation of the connecting switch of the setting set, the connecting switch establishing connection with the group selector which is connected together with the feed transmission. When the connecting switch reaches this group selector, the test relay 2P*a* will be energized, thereby effecting restoration of the high resistance start relay 2AN. The current flowing over the conductor *a*102 is at the same time increased, thereby causing energization of relay 1U which is disposed in the feed transmission and which is operative to initiate the transmission of the current impulses stored in the storer S*p*. Responsive to each current impulse, voltage is disconnected from the *a*102-conductor, thereby causing restoration of the testing relay 2P*a* in the setting set of the group selector. The impulsewise operation of the testing relay effects impulsewise switching of a relay chain for marking the decade in accordance with the corresponding impulse series. As soon as the first current impulse series is transmitted from the storer, the group selector is actuated and sets its wipers in engagement with an idle contact of the designated decade. When this contact is reached, the testing relay 2P*b* is energized, stopping further motion of the group selector wipers and initiating disconnection of the setting set. As soon as the setting set is disconnected, ground is disconnected from the *a*102-conductor, thereby causing restoration of relay 1U in the feed transmission. During the delayed release of the relay 1Y, shown in FIG. 1*b*, a test is made to ascertain whether the connection is to be extended to another exchange, requiring transmission over the *a*-conductor of current impulse series in the form of ground impulses, or is to remain in the same exchange. If the latter is the case, no particular switching operations are effected and after restoration of the relay 1Y (FIG. 1*b*), voltage is again connected by way of relay 1U to the *a*102-conductor, so as to effect energization of the start relay 4AN of the setting set 4ES (FIG. 4), which is common to a plurality of connectors. Thereupon, as soon as the connecting switch of the setting set 4ES has reached the connector 4LW, relay 1U is again energized and the next following current impulse series will be released.

However, if the call is to be extended to another exchange to which the current impulses are to be transmitted over the *a*-conductor in the form of ground impulses, voltage is connected by such other exchange, to the conductor *a*102 and relay 1D in the feed transmission is energized. Switching operations are thereby effected in the feed transmission, as will be presently described more in detail with reference to FIGS. 1*a* and 1*b*, so as to transmit the successive current impulses as ground impulses over the *a*-conductor.

After the current impulse series, which designates the decade in the connector, has been received in the setting set 4ES, switch-over relay 3U in the feed transmission 3S*p*U*e* and switchover relay 4U*a* in the setting set 4ES of the connector will be energized by way of the conductor *d*203. Relay 3U in the feed transmission completes a holding circuit for itself opening at the same time the energizing circuit. Relay 4U*a* in the setting set of the connector will also be held in a holding circuit completed thereby. The energization of relay 3U in the feed transmission serves at the same time as a signal for releasing the connector for the decade selection. Relay 3U also actuates contact 3*u* for preparing a circuit for the energization of the seizure relay 3C. However, seizure relay 3C cannot energize at this time for lack of potential on the conductor *d*203 in the setting set of the connector.

When the connector has reached the designated decade, the testing relay 4P will be energized and disconnection of the ground potential in the setting set of the connector will be initiated. Relay 1U in the feed transmission 3S*p*U*e* and the connector LW. The line conductors and lease of relay 1Y (FIG. 1*b*). Upon release of relay 1Y, voltage is by way of relay 1U again placed on conductor *a*102, signifying that the setting set of the connector is needed again. The setting set of the connector had been released responsive to energization of the testing relay 4P. When the connector reaches the marked step of the selected decade, the testing relay 4P will again energize and stop further operation of the connector. Depending upon the energization of the testing relay 4P, the seizure relay 3C of the feed transmission 3S*p*U*e* will be caused to energize. The seizure relay 3C now connects the testing circuit for the testing of the called subscriber's line. Moreover, if the called line is idle, ringing current will be placed on the line conductors extending to the called line. The calling subscriber receives at the same time the ringing tone. However, if the called line is busy, busy tone will be transmitted to the calling subscriber as a signal that he should replace the receiver, whereupon the connection is released.

As indicated in FIG. 4 in dotted lines, a further group selector, for example, in larger exchanges, a fourth group selector, may be disposed between the feed transmission 3*SpUe* and the connector LW. The line conductors and the control or private conductors of such group selector are directly connected through and the switching operations accordingly correspond to those already described.

FIGS. 1*a* and 1*b* show the supply transmission for the calling subscriber and the storage device for storing the train of pulses sent out by the subscriber. The storage device has laminations which are arranged in a circle and are pushed below a guide ring by a marker magnet corresponding to the number of pulses of a number. In each case, the last lamination remains standing above said guide ring and thus characterizes the end of a train of pulses. If for instance a train of pulses consists of seven impulses, the laminations 1 to 6 are pressed below the guide ring and the lamination 7 remains standing above the guide ring. Upon the feeding out of a series of pulses from this storing device, a switch arm 1*pk*55 is moved forward stepwise and upon coming against a lamination which is above the guide ring, closes a circuit for a relay which thereby characterizes the end of a train of pulses. Furthermore, the storage device also has normal-position contacts (off-normal contacts) *so*67 and *so*75, which are actuated on departure from normal position. The contact 1*pe*96 is opened when the end position is reached, that is, when the storage device is completely filled and interrupts the further receipt of the arriving current impulses.

The storage transmission shown in FIGS. 1*a* and 1*b* is seized by the preceding connecting device, a call-finder, via the private conductor *c*3 as follows:

(1) +, . . ., *c*3-wire, 1*a*22, 1*v*27, 1AUI, 1*u*28, 1*k*29, 1*c*32, −

In this circuit, the relay 1A is attracted and by opening its contact 1*a*22 opens the short circuit for the seizure relay 1C which is thereby inserted in the circuit (1) and energizes. Furthermore, the winding V of the transformer 1U*e* is connected via contact 1*a*39 to the dial tone:

(2) +, 1U*e*V, 1*v*37, 1*d*38, 1*k*40, 1*a*39, WZ

The dial tone is transmitted inductively from the winding V to the windings I and II of the transformer 1U*e* and sent out from the latter via the line conductors *a*1 and *b*2 to the subscriber so as to cause him to start dialing. After energization of relay 1C the energization circuit for winding III of relay 1A is interrupted. Relay 1A is however held via its winding I and II and the subscriber loop in the following circuit:

(3) +, 1AII, *b*2-wire, subscriber loop, *a*1-wire, 1AI, 1*c*6, −

Via contact 1*c*90, ground potential is applied to the private conductor 104*c* leading to the successive connecting device:

(4) +, 1*c*90, G*r*87, 1*z*84, 104*c* conductor, . . .

Responsive to the dial tone, the subscriber now sends out by means of his dial the first series of impulses which, let us say, consists of six impulses. In the supply transmission, the impulse receiving relay 1A deenergizes in a pulse-like manner. Upon the first deenergization of the relay 1A, due to the opening of the contact 1*a*23, relay IV is connected via its winding I:

(5) +, . . ., *c*3-wire, 1*a*22, 1VI, 1*f*24, W*i*30, 1*c*31, −

By closing the contact 1*a*22 the seizure relay 1C is short-circuited, but is nevertheless held for a series of impulses, due to its delay in deenergizing. The seizure relay 1C, after cutting off of its energizing circuit, was held in the following circuit:

(6) +, . . ., *c*3-wire, 1C, 1*a*23, 1*f*24, W*i*30, 1*c*31, −

After energization of the relay V by means of its contact 1*v*99, the relay 1K is energized which relay is held via its contact 1*k*100, independently of contact 1*v*99 in the following circuit:

(7) +, 1*c*90, 1*d*98, 1*k*100, 1KII, −

Furthermore, upon energization of relay 1K the dial tone is disconnected by the opening of the contact 1*k*40 and preparation is made for sending out of a busy signal by the closing of the contact 1*k*41.

Upon the deenergization of the relay 1A, the storage magnet 1EM of the storage device is energized via contact 1*a*95 in the following circuit:

(8) +, 1*c*90, 1*a*95, 1*pe*96, 1EM, −

The storage magnet 1EM is attracted and after energization of the relay A, the EM magnet which deenergizes shifts the laminations one step further. The off-normal contacts are thereby actuated. Minus potential lies, via contact 1*so*75 in the following circuit on the outgoing line conductor *a*102:

(9)

$-, \frac{1\mathrm{UI}}{\mathrm{W}i76}$, 1*so*75, 1*y*73, 1*k*71, 1*c*56, 1*i*17, 102*a* conductor, . . .

By the application of this voltage to the *a*102 conductor a setting set associated with the succeeding connecting device is excited. The relay 1U receives current insufficient to effect its operation while the individual set is being seized and can therefore not be attracted. At the end of the first impulse, the pulse receiving relay 1A is again attracted and by opening its contact 1a22, again connects the seizure relay 1C (cf. circuit 6) and, via its contact 1a23, short-circuits the relay IV which, however, due to its delayed deenergization, remains energized during a series of pulses. Furthermore, by the opening of the contact 1a95, the storage magnet 1EM is disconnected, which magnet, after deenergizing, energizes the marker magnet 1MM via contact 1e93:

(10) +, 1c90, 1em93, 1v94, 1MM, —

The marker magnet 1MM holds itself energized independently of the contact 1em93 by its own contact 1mm92 which is parallel to said last mentioned contact. After the second impulse the laminations are moved forward by one step further. The second lamination is thereby pressed by the marker magnet 1MM under the aforementioned guide ring. After the sixth pulse, the relay 1A remains energized so that relay IV deenergizes with delay by the short-circuiting of its windings I by contact 1a23. After the deenergizing of relay V, the marker magnet 1MM is disconnected by the opening of the contact 1v94 so that the sixth lamination can no longer be pushed below the guide ring like the preceding five laminations. This lamination remains above the guide ring when the laminations are moved one step further forward upon the occurrence of the next train of pulses. The further trains of pulses which arrive are taken up by the storage device and stored in the same manner as already described.

As soon as one setting set seizes the succeeding connecting device, the high ohmic starting relay of said setting device which is connected to the 102a conductor is disconnected and via the low ohmic test relay which is now connected, an amplification of current is obtained so that the relay 1U in the storage device can energize via its winding I in accordance with circuit 9. Via contact 1u60 the de-storing magnet 1AM and the pulse transmitting relay 1J are energized in the following circuits:

(11) +, 1y58, 1y59, 1u60, 1i70, 1AM, —

(12) +, 1y58, 1y59, 1u60, 1i61, Gr65, Wi69, 1JIII, —

The relay 1J can however not be actuated since it is counter-energized via its windings I and II by the charging current for the capacitor Ko66:

(13) +, 1y58, 1y59, 1u60, 1i61, Ko66, 1JI, 1JII, —

As soon as the capacitor Ko66 is charged, relay 1J is actuated via its winding III and holds itself, due to the discharge current Ko66 in the following circuit:

(14) +(ko66), Gr65, Wi69, 1jIII, 1JII, 1JI, —(Ko66)

Furthermore, the capacitor further discharges in the following circuit:

(15) +(Ko66, 1i62, Gr63, Wi64, 1JI, —Ko66)

During the time of actuation of the relay 1J, voltage is disconnected from the a102 conductor by the opening of the contact 1i17 (see circuit 9) and a pulse is thus transmitted to the setting set. Furthermore, by the opening of the contact 1i70, the de-storage magnet 1Am is discontinued, which magnet, after it has deenergized, prepares a test circuit for the test wiper pk55 of the storer selector by closing the contact 1am54:

(16) +, 1c90, 1i91, 1pk55, 1am54, Gr53, 1d47, 1YI, —

Since the second lamination is below the guide ring, this circuit is not closed, so that relay 1Y cannot energize. After the discharge of the capacitor Ko66, relay 1J deenergizes and by closing its contact 1i17 again applies voltage to the 102a conductor (cf. circuit 9). Via contact 1i70, the destorage magnet 1Am is again energized and the charging circuit for the capacitor Ko66 is again closed via contact 1i61. During the time in which relay 1J was energized, relay 1U was held via its winding II in the following circuit since the holding circuit for winding I was interrupted by the opening of the contact 1i17:

(17) +, 1c90, 1i91, 1UII, —

During the sending out of the sixth pulse, the test wiper pk55 is on the lamination located above the guide ring so that the energizing circuit for the relay 1Y (see circuit 16) is closed after the deenergization of the destorage magnet 1AM. Relay 1Y actuates and holds itself, independently of its holding circuit, in the following circuit:

(18) +, 1k19, 1u48, 1y51, 1d47, 1YI, —

By opening of contact 1y58 and 1y59, ground potential is removed from the pulse transmitting relay 1J and the destorage relay 1AM so that they can no longer energize. Via contact 1y72, relay 1U is held via its winding I in the following circuit:

(19) +, . . ., 102a-wire, 1i17, 1c56, 1k71, 1y72, 1u77, 1UI, —

After the setting of the succeeding connecting device of a first group selector to an idle outgoing line, ground potential is disconnected from the 102a conductor so that relay 1U deenergizes. After the deenergization of relay 1U, the holding circuit for relay 1Y (cf. circuit 18) is interrupted by the opening of the contact 1u48, but relay 1Y is held by the discharge current until the discharge of the capacitor Ko49:

(20) +(Ko49), 1y51, 1d47, 1YI (minus line), Wi50, —(Ko49)

Furthermore, via contact 1u78, relay 1D is connected to the 102a conductor in the following circuit:

(21) +, 1c90, Gr87, 1D, 1d80, 1u78, 1y72, 1k71, 1c56, 1i17, 102a conductor, . . .

If the group selector has been set by the train of pulses sent out to an outgoing connecting device which operates in accordance with the same technique as described (pulse-wise interruption of the voltage), no voltage is present therein on the 102a conductor; relay 1D cannot energize. If there is involved, however, a connecting device which is set by ground current pulses, this is made known by the placing of minus voltage on the 102a conductor, so that the relay 1D energizes.

By opening contact 1d38, the prepared connecting of the busy signal is interrupted. Relay 1D maintains itself independently of the energizing circuit in the following holding circuit:

(22) +, 1c90, Gr87, 1D, 1d79, 1y81, —

By opening contact 1d47, the short-circuit for the winding II of the relay 1Y is interrupted, so that the relay 1Y deenergizes after discharge of the capacitor Ko49. Furthermore, by opening contact 1d98, relay 1K is disconnected (cf. circuit 7). After the deenergization of relay 1K relay 1U is energized in the following circuit via the contacts 1k20 and 1k21 of relay 1K:

(23) +, 1k20, 1k21, 1so75, $\frac{1UI}{Wi76}$, —

Via relay 1u60, the destorage magnet 1AM (cf. current path 11) is energized, and the pulse transmitting relay 1J is connected (cf. circuits 12 to 15). As soon as the contact arm 1pk55 has reached the next marked lamination, relay 1Y energizes (cf. circuit 16) and interrupts the further transmission of pulses. Relay 1Y is held by the discharge current of the capacitor Ko49 (cf. circuit 20) and deenergizes with a very strong time delay after discharge of the capacitor Ko49 via winding 1YII. The closing of contacts 1y58 and 1y59 initiates the sending out of the next train of pulses.

During the time of energization of the pulse transmitting relay 1J, a ground pulse is sent out in each case via the 102*a* conductor, by the application of ground:

(24) +, 1*k*20, 1*i*16, 102*a*-wire, . . .

After the sending out of all trains of pulses relay 1U is disconnected by the opening of the normal contact 1*so*75.

If the relay 1D does not operate, relay 1Y deenergizes and via its contact 1*y*73 connects voltage to the 102*a* conductor (cf. circuit 9) so as to obtain a setting set of the connecting device reached. After connection of a setting set, the destorage of the trains of pulses is introduced as already described. When all digits have been removed from the storage device, the normal contact 1*so*75 of the pulse repeater is interrupted and thus the start circuit for further setting sets is interrupted.

If the selector arranged in the succeeding connecting device does not find any idle outgoing connecting line, then after the stopping of the selector at a full-rotation step, voltage is applied to the 103*b* conductor. The metering relay 1Z is thereby energized via its winding I:

(25) +, 1*k*19, 1*k*18, 1ZI, D*r*12, 1U*e*IV, 103*b*-wire, . . . —

By the opening of the contact 1*z*84, ground potential is removed from the 104*c* conductor (cf. circuit 4) and succeeding connecting device is thereby released. Relay 1Z holds itself, independently of its energizing circuit, via its winding II in the following circuit:

(26) +, 1*c*90, 1*d*98, 1*k*100, 1*z*101, 1ZII, —

By closing the contact 1*z*42, a busy signal is connected to the winding V of the transformer 1U*e*:

(27) +, 1U*e*V, 1*v*37, 1*d*38, 1*k*41, 1*z*42, busy signal

From winding V, busy tone is transmitted to the calling subscriber via the windings I and II of the transformer 1U*e*. The busy signal causes the calling subscriber to release the seized connecting device by replacing the receiver.

Furthermore, when the selector stops at the full rotation step, the holding circuit for relay 1U (cf. circuit 19) is interrupted. After release of relay 1U, the holding circuit for relay 1Y (cf. current path 18) is opened by the opening of contact 1*u*48, relay 1Y however holding itself until the discharge of the capacitor K*o*49 in accordance with circuit 20.

As soon as the calling subscriber, as a result of the busy signal has replaced his receiver, the holding circuit for windings I and II of relay 1A (cf. circuit 3) is interrupted. Relay 1A deenergizes and via its contact 1*a*22 short circuits the winding of the seizure relay 1C which is thereby caused to deenergize with delay. During the restoring time of relay 1C, relay 1V can energize in accordance with circuit 5. Furthermore, the closure of contact 1*a*95, the storage magnet 1EM is connected in accordance with the circuit 8. As soon as relay 1V is energized and the seizure relay 1C has restored, relay 1K is held independently of the holding circuit via its winding II (cf. circuit 7) via its winding I:

(28) +, . . ., *c*3-wire, 1*a*22, 1*y*26, 1K, 1*c*32, —

After the delayed release of the seizure relay 1C, the holding circuit for relay IV is interrupted by the opening of the contact 1*c*31 so that relay IV deenergizes. Furthermore, by the opening of contact 1*c*90, relay 1Z and the storage magnet 1E*m* are disconnected. By the closure of contact 1*c*27, relay 1U is energized via its winding I in the following circuit:

(29) +, 1*y*58, 1*c*57, 1*k*71, 1*y*73, 1*so*75, $\frac{\text{1UI}}{\text{Wi76}}$—

Relay 1U actuates and via its contact 1*u*60, closes the circuit 11 for energizing the destorage magnet, 1AM and the circuits 12 and 13 for the pulse transmitting relay 1J. Relay 1J actuates, after the capacitor K*o*66 has been charged and holds itself until discharge of this capacitor in accordance with circuits 14 and 15. In the meantime, relay IV releases and by opening the contact 1*v*26, interrupts the holding circuit for relay 1K (cf. circuit 28). After the delayed release of relay 1K, relay 1U is held in the following circuit instead of circuit 29:

(30) +, 1*k*20, 1*k*21, 1*so*75, $\frac{\text{1UI}}{\text{Wi76}}$, —

Upon actuation of relay 1J, the destorage magnet 1A*m* is disconnected by the opening of contact 1*i*70. As soon as relay 1J releases after the discharge of the capacitor K*o*66, the charging circuit for this capacitor is again closed by the closing of contact 1*i*61 and the destorage magnet 1AM is again connected via contact 1*i*70. This interplay between the pulse transmitting relay 1J and the destorage magnet 1AM continues until, after reaching the normal position of the storage device, the normal contact 1*so*75 is opened and the holding circuit for relay 1U (cf. circuit 30) is thereby interrupted.

Relay 1U is however held during the time of energization of the destorage magnet 1A*m* by the contact 1*am*74 which lies in parallel to contact 1*so*75. After the actuation of the pulse transmitting relay 1J, the destorage magnet 1A*m* is disconnected by the opening of the contact 1*i*70, this magnet in its turn disconnecting relay 1U by the opening of contact 1*am*74. Relay 1U, by opening its contact 1*u*70, interrupts the energizing circuit for relay 1J and the destorage magnet 1AM.

Furthermore, via contact 1*u*28, the seizure circuit for the supply transformation SpU*e* shown is prepared (cf. circuit 1). The supply transformation is thus again in normal condition and can again be seized.

If however no busy signal is transmitted from the succeeding connecting device, then, as already mentioned, after the destorage of the last impulse by the opening of the contact 1*so*75, the circuit for obtaining a further setting set (cf. circuit 9) is interrupted.

If the connection is switched through to the subscriber line desired, and if the latter is idle, then during the release time of relay 1Y, voltage is applied to the 102*a* conductor by the succeeding connecting device so that relay 1D energizes via current path 21. Via contact 1*d*80, relay 1D closes a holding circuit for itself (cf. circuit 22). Via contact 1*d*97, ground is applied to the outgoing 104*c* conductor independent of circuit 4:

(31) +, 1*c*90, 1*d*97, G*r*88, *c*104 conductor, . . .

At the same time, due to the opening of the contact 1*d*98, the holding circuit for relay 1K (cf. circuit 7) is interrupted, so that relay 1K restores with time delay.

As soon as the called subscriber answers, voltage is applied to the 103*b* conductor by the succeeding connecting device (connector). No switching operations are thereby produced in the battery feed transformation, since the energizing circuit for relay 1Z is interrupted after the restoration of relay 1K (cf. circuit 25).

After completion of the conversation, the connection is released when the calling subscriber hangs up. The pulse receiving relay 1A restores (cf. circuit 3), since after the receiver has been hung up, the subscriber's loop is opened. By closing the contact 1*a*22, the winding of the seizure relay 1C is short-circuited and such relay 1C is thereby caused to restore with time delay. At the same time, by the opening of the contact 1*a*23, relay IV (cf. circuit 5) is connected. Furthermore, via contact 1*a*95, the circuit for energizing the storage magnet 1EM (cf. circuit 8) is closed. After actuation of relay IV, relay 1D is held, independently of circuit 22 in the following circuit:

(32) +, 1*v*85, 1D, 1*d*79, W*i*82, —

Furthermore, ground is applied to the outgoing 104*c* conductor independently of circuit 31 (via contact 1*v*86.

(33) +, 1*v*86, 104*c* conductor, . . .

After the delayed release of the seizure relay 1C, the circuit for the storage magnet 1EM is interrupted by the opening of the contact 1*c*90 so that the storage magnet restores. At the same time the holding circuit for relay 1D (cf. circuit 22) is interrupted, but relay 1D continues to hold itself in accordance with the circuit 32. Furthermore, after the opening of contact 1*c*90, ground potential would be removed from the 104*c* conductor if it were not connected in accordance with circuit 33 via contact 1*v*86 in order not to release the connection which has been made until the metering pulse has been transmitted. After the closing of contact 1*c*32, relay 1K can energize via its winding I in the circuit 28. Furthermore, a circuit for winding I of the metering relay 1Z is closed via contact 1c46:

(34) +, 1c46, 1ZI, D*r*12, 1UIV, *b*103 conductor, . . .

Finally, after the release of relay 1C, the holding circuit for relay IV (cf. circuit 5) is interrupted, by the opening of the contact 1*c*31, so that relay IV restores with time delay. After energization of relay 1K, relay 1U is connected in accordance with circuit 29 by the closing of contact 1*k*71, Relay 1Z by closing its contact 1*z*36, applies voltage to the *z*5 conductor:

(35) —, 1*z*36, 1*d*35, *z*5 conductor, . . .

After the energization of relay 1U the destorage magnet 1AM and the pulse transmitting relay 1J are connected via contact 1*u*60. There now take place exactly the same switching operations as already described in connection with the release after transmission of busy signal. After the delayed release of relay IV, the holding circuit for relay 1D (cf. circuit 35) is interrupted. At the same time, by the opening of contact 1*v*86, ground is removed from the outgoing 104*c* conductor. The succeeding connecting devices are in this manner released. As a result of the release of the succeeding connecting device, the voltage lying on the 103*b* conductor is disconnected and the metering relay 1Z releases (cf. circuit 34). It may be mentioned here that the relay 1D after energization of the metering relay 1Z was held, via contact 1*z*83, so that relay 1D after the release of relay 1Z also releases. By the opening of contact 1*z*36, the transmission of the metering impulse is terminated. As soon as relay 1D is released, relay 1K is caused to release by the opening of contact 1*d*25 over which, after the opening of contact 1*v*26, the holding circuit for winding I of relay 1K was maintained (cf. circuit 28). After relay 1K has restored, the seizure circuit (cf. circuit 1) is again prepared via contact 1*k*29 and the supply transformation can again be seized.

It may also be mentioned here that in case of long-distance calls, the long-distance marking relay 1F is caused to energize via its winding II over the 105*d* conductor. Independently of this energizing circuit, it holds itself by connecting its winding I after the opening of contact 1*f*24 over the incoming *c*3 conductor. By closing contact 1*f*33, the calling subscriber line is marked as being busy with a long-distance call by direct application of ground potential to the *d*4 conductor. Furthermore, a circuit for the metering relay 1Z is closed via contact 1*f*45. The metering current pulses are transmitted during the conversation by the application of voltage to the 103*b* conductor, so that relay 1Z can energize and transfer these metering pulses in circuit 35 to the charge meter of the calling subscriber. The release at the end of the conversation is the same as already described in connection with a connection to a subscriber of the same local network.

FIGS. 2*a* and 2*b* show the feed transmisison 3S*p*U*e* for the called subscriber as well as the relay set associated with this feed transmission. This relay set tests the called line for busy or idle condition. Switching means are associated with the feed transmission for controlling the ringing of the called party and likewise the transmission of ringing tone and busy tone to the calling party.

FIGS. 3*a* and 3*b* show the connector LW and the setting set 4ES allocated to the connector.

Voltage is placed on the conductor *a*120 (see circuit 9) as soon as a preceding group selector has established connection with the feed transmission 3S*p*U*e*.

If the feed transmission is connected with a succeeding group selector over which the connector is to be reached, the start relay of the setting set allotted to such group selector will be energized. When such group selector is set, the line conductors and the control or private conductors are directly switched through and it may therefore be assumed in the following explanations, that the feed transmission 3S*p*U*e* is directly connected with the connector LW.

Responsive to placing voltage on the conductor *a*120 in the feed transmission 3S*p*U*e*, the start relay 4A*n* in the setting set 4ES will energize by way of its windings I and II:

(36)
+, 4*a*36, 4*e*35, 4ANII, 4*e*32, 4ANI, 4*d*31, 4*u*30,
conductor *an*20, G*r*5, 4*cg*4, conductor *a*200 (FIG. 3),
3U*e*III, 3*c*6, 3U*e*I, conductor *a*120, . . . , —

It may be mentioned at this point that the supervising relay 4U is in the normal condition of the setting set energized:

$$(37)\qquad +,\ 4d71,\ 4e72,\ 4h73,\ \frac{4U}{Ko74,\ Wi75},\ -$$

The capacitor K*o*74 is so dimensioned that the supervising relay 4U does not release during the interruptions of the circuit 37 incident to the setting and seizure of the setting set. It releases only when the current is interrupted for an extended interval, for example, responsive to the blowing of a fuse. In such case, the start circuit is interrupted by the opening of contact 4*u*30, and the setting set cannot be seized.

As soon as the start relay 4AN is energized, relay 4E will be connected by way of contact 4*an*64. Relay 4E is upon energization held over its winding I while winding II is short circuited by way of contact 4*e*63:

(38) +, 4*an*64, 4*e*63, 4EI, —

Closure of contact 4*e*33 and opening of contact 4*e*32 effects connection of the resistor W*i*34 in the circuit 36 in place of the winding II of the start relay 4AN. Relay 4V is energized over its windings I and II, by way of contact 4*e*82, holding itself over its winding II while its winding I is short circuited by way of contact 4*v*84:

(39) +, 4*e*82, 4*v*84, 4VII, —

Closure of contact 4*e*81 finally starts the operation of the motor switch in the setting set by energization of the field coils 4N*a* and 4N*b*. These field coils 4N*a* and 4N*b* are displaced by 90°. An armature is rotatably journalled at the point of axial intersection of the field coils, such armature being rotated by the action of the magnetic fields alternately produced by the field coils. The rotary motion of the armature is transmitted by a gear to the switch shaft and therewith to the wipers 4*n*21 and 4*n*27 carried thereby. The field coils are alternately operatively connected by cam contacts 4*na*76 and 4*nb*77 which are controlled by the switch shaft.

When both field coils are energized, the armature will be held against rotation and the switch operation is thus stopped. In the illustrated position of the contacts, the field coil 4N*b* is energized:

(40) +, 4*e*81, 4*nb*77, 4N*b*, —

The field coil 4N*b* attracts the armature, thereby causing closure of the cam contact 4*na*76 and opening of the cam contact 4*nb*77, and thus operatively connecting the field coil 4N*a*:

(41) +, 4*e*81, 4*na*76, 4N*a*, —

The armature is now attracted by the field coil 4N*a*.

The cam contact 4na76 is now opened again and the field coil 4Nb is energized by way of the cam contact 4nb77. The wipers 4n21 to 4n27 are at the same time moved.

As soon as the wiper 4n21 reaches the bank contact to which is connected the connector, the testing relay 4P can energize in the following circuit by way of voltage lying on the conductor a120:

(42) +, 4PII, 4PI, 4v38, 4u37, wiper 4n21, 4cg4, conductor a200, (FIG. 3) UeIII, 3c6, 3UeI, conductor a120, 721, —

The current flowing over the conductor a120 is increased by the switching in of the low resistance windings of the testing relay 4P. This criterion is evaluated in the storer (FIG. 1) and the digit required for the setting of the connector to the desired decade is transmitted from the storer.

Closure of contact 4p78 effects energization of both field coils of the motor switch and the operation of the switch is in this manner stopped. Relay 4A is now operatively connected over its winding II by way of contact 4p44:

(43) +, 4p44, 44d41, 4AII, —

Relay 4A short circuits the winding II of the testing relay 4P by way of contact 4a45. Moreover, opening contact 4a36 interrupts the holding circuit for the start relay 4AN (see circuit 36). Due to opening of contact 4a106 and closure of contact 4a57, the seizure relay 4C can now energize:

(44) +, 4a57, Wi105, 4C, 4v108, —

The switch is held with the wipers on the corresponding bank contacts independently of the testing relay due to closure of contact 4c79 in parallel with contact 4p78 of the testing relay.

After release of the start relay 4AN contact 4an64 disconnects relay 4E which releases with delay owing to the short circuit of its winding II, and opening of contact 4e81 disconnects the energizing circuit of the field coils 4Na and 4Nb. Opening of contact 4e82 disconnects relay 4V which releases with delay due to the short circuit of its winding I.

The current impulses transmitted from the storer (FIG. 1) arrive by way of the conductor a120 as current interruptions during the release time of the relays 4E and 4V, respectively. Relay 4P releases impulsewise and causes by the opening of contact 4p44 impulsewise release of relay 4A (see circuit 43). Upon each release of relay 4A, relay 4C is short circuited over contact 4a106, relay 4C accordingly remaining energized (see circuit 44) during the transmission of an impulse series despite the impulsewise opening of contact 4a57. By way of contact 4a56, relay 4V which is held actuated, is energized again incident to each impulse interruption:

(45) +, 4a56, 4c55, 4v54, 4e83, 4v84, 4VII, —

Upon occurrence of the first current interruption of an impulse series consisting of three impulses, relay 4R is energized by way of contact 4a56:

(46) +, 4a56, 4c55, 4v54, 4h86, 4s90, 4RI, —

Relay 4R belongs to the relay counting chain comprising the relays 4R, 4S, 4T, 4W and the auxiliary relay 4H, serving for the marking of the desired decade. When relay 4A energizes again at the conclusion of the impulse, relay 4C is according to circuit 44 switched in and relay 4R is held over its winding II:

(47) +, 4a57, 4r96, 4RII, —

Relay 4S is now connected by way of its winding II, by the actuation of contact 4r99:

(48) +, 4a47, 4r99, 4h101, 4SII, —

Upon receipt of the second current impulse relay 4S is held during the release of relay 4A by way of contact 4a56, over its winding I:

(49) +, 4a56, 4c55, 4v54, 4s91, 4SI, —

The energizing circuit for relay 4R (see circuit 46) is interrupted by the opening of contact 4s90 and relay 4R consequently releases. When relay 4A energizes again at the conclusion of the current impulse, relay 4S will be held over its winding II in the circuit:

(50) +, 4a57, 4r97, 4s98, 4SII, —

Relay 4H is now operatively connected by way of contact 4s103 over its winding II:

(51) +, 4a57, 4r100, 4s103, 4HII, —

Upon arrival of the third current impulse, relay 4S will be held according to circuit 49, and relay 4H is held in the circuit:

(52) +, 4a56, 4c55, 4v54, 4h85, 4u87, 4HI, —

Relay 4R is connected over its winding I by way of contact 4h85:

(53) +, 4a56, 4c55, 4v54, 4h85, 4t88, 4s89, 4RI, —

When relay 4A energizes again at the conclusion of the current impulse, relay 4R will be held in the circuit 47; relay 4H, winding II, is held in the circuit:

(54) +, 4a57, 4r99, 4h102, 4TI, 4HII, —

Relay 4T energizes in this circuit. The holding circuit for the winding I of relay 4S is interrupted and this relay restores. Accordingly, at the conclusion of the third current impulse, relays 4R, 4T and the auxiliary relay 4H of the relay counting chain are energized.

After the last current impulse, the holding circuit for relay 4V (see circuit 45) is not closed and relay 4V accordingly releases with a delay. Relay 4V, by opening its contact 4v38 disconnects the testing relay 4P (see circuit 47). Relay 4A is held over its winding I and conductor a120 (see circuit 19) by way of contact 4v39:

(55) +, 4a43, 4AI, 4v39, 4u37, wiper 4n21, 4cg4, conductor a200, 3UeIII, 3c6, 3UeI, conductor a120, . . . , —

Upon release of relay 4P, the winding II of relay 4A (see circuit 43) is disconnected.

After the delayed release of relay 4V, a circuit is closed for relay 4Ua by way of contact 4v49 (FIG. 4). In this circuit, relay 3U arranged in the feed transmission 3SpUe (FIG. 3) energizes:

(56) +, . . . , conductor c122, 3c85, 3c90, EUIII, 3u92, conductor d203, 4cg6, 4u23-wiper, 4v49, 4a50, Wi51, 4UaI, —

Relay 4Ua, by closing its contact 4ua109, closes a holding circuit over its winding II which is independent of its energizing circuit. In this circuit, the seizure relay 4C is held which would deenergize after release of relay 4V and opening of contact 4v108:

(57) +, 4a57, Wi105, 4C, 4UaII, 4ua109, —

Relay 4D is operatively connected by way of contact 4ua65:

(58) +, 4t69, 4D, 4ua65, —

Relay 4D energizes and over its contact 4d62 connects the field coils 4Ma and 4Mb of the motor of the connector. The operation of this motor switch is the same as already explained in connection with the connecting switch for the setting set. In the illustrated normal position, field coil 4M*a* will be energized:

(59) +, 4*d*62, 4*n*26-wiper, 4*ma*8, 4M*a*, —

The armature of the motor switch is attracted by the field coil 4M*a*. The cam contact 4*ma*8 is now opened and the cam contact 4*mb*9 is closed, resulting in energization of field coil 4M*b*:

(60) +, 4*d*62, 4*n*26-wiper, 4*mb*9, 4M*b*, —

The testing relay 4P is simultaneously with the switching in of the field coils connected to the test wiper *d*413, over contact 4*d*42:

(61) +, 4PII, 4PI, 4*d*42, 4*u*22-wiper, *d*413-wiper, . . .

It may be mentioned at this point that voltage is connected to a main stop contact arranged ahead of the third decade, in the circuit:

(62) —, W*i*110, 4*s*122, 4*t*129, 4*r*125, 4*w*124, 4*ub*135, HR3, . . .

As soon as the test wiper *d*413 reaches this marked main stop contact, test relay 4P will energize in accordance with circuit 61. Closure of its contact 4*p*60 will stop the operation of the switch due to simultaneous energization of its field coils 4M*a* and 4M*b*. The two field coils are then interconnected in the circuit:

(63) 4M*a*, 4*n*25-wiper, 4*p*60, 4*n*27-wiper, 4M*b*

Closure of contact 4*p*44 short circuits the winding I of relay 4A causing deenergization thereof. After release of relay 4A, instead of ground according to circuit 55, there will be ground on the conductor *a*120 of the feed transmission 3S*p*U*e* in FIG. 3, in the circuit:

(64) +, 4*p*44, 4*d*40, 4*p*39, 4*u*37, 4*n*21-wiper, 4*cg*4, *a*200-wiper, 3UIII, 3*c*6, 3U*e*I, *a*120-wiper, . . . , —

By the closure of contact 4*a*61 parallel to contact 4*p*60, both field coils 4M*a* and 4M*b* (see circuit 63), will be interconnected independently of the release of test relay 4P and will accordingly be simultaneously energized. The holding circuits for relays S, T and H of the relay counting chain (see circuits 47 and 54) will be interrupted by the opening of contact 4*a*57. The opening of this contact also interrupts the holding circuit for relay 4C and for winding II of relay 4U*a* (see circuit 57). With the exception of relay 4C the winding of which is short circuited over contact 4*a*106, the relays restore without delay. After the release of the relays of the counting chain and the relay 4U*a*, the energizing circuit for the test relay 4P (see circuits 61 and 62) is interrupted and relay 4P releases. Opening of contact 4*t*69 disconnects relay 4D (see circuit 58) and this relay restores with delay due to its slow-to-release feature.

Relay 4P by opening its contact 4*p*44 interrupts circuit 64, thereby giving to the storer a signal that the switch has been set. Upon opening contact 4*p*60, the field coils 4M*a* and 4M*b* of the connector are as already mentioned energized over contact 4*a*61 and the switch is thus held with its wipers set on the desired bank contacts. After the delayed release of relay 4D, the two field coils of the connector are disconnected by the opening of contact 4*d*62 and such coils are, accordingly, deenergized. Closure of contact 4*d*31 extends the start conductor *an*20 through to the start relay 4AN (see circuit 36). After release of the relay 4D, the setting set is again in normal position and ready for use in connection with another call.

In the feed transmission, the following switching operations will take place after the energization of relay 3U (see circuit 56). An energizing circuit is closed by way of contact 3*u*16 for the toll marking relay 3F:

(65) +, 3*u*16, 3*c*17, 3FI, 3*z*22, 3*g*20, D*r*2, 3U*e*II, conductor *b*121, . . .

In incoming toll calls, during the transmission of the last current impulse series which serves for the setting to the desired subscriber station, voltage is placed in the toll transmission circuit on the conductor *b*121 and the toll marking relay can accordingly energize in the circuit 65.

Independently of its energizing circuit, relay 3U after closure of its contact 3*u*91 will hold itself over its winding III in the circuit:

(66) +, . . . conductor *c*122, 3*c*85, 3*c*90, 3UIII, 3*u*91, W*i*93, —

The energizing circuit for relay 3U (see circuit 56) is at the same time interrupted by the opening of contact 3*u*92.

The setting set 4ES (FIG. 4) is again placed in operation for the transmission of the last current impulse series which serves to set the connector with its wipers in engagement with the bank contacts of the desired subscriber line. The switching operations for placing the setting set in operation, up to the transmission of the last current impulse correspond to those already described (see circuits 35 to 54).

It shall be assumed that the last impulse series consists again of three current impulses. The relay chain is accordingly switched as already described in connection with the switching operations incident to the receipt of the penultimate impulse series (see circuits 46 to 54). At the conclusion of the impulse series, that is, after the third impulse, relays 4R, 4H and 4T will be energized (see circuits 47 and 48).

Responsive to delayed release of relay 4V, upon conclusion of the impulse series, the test relay 4P is disconnected by opening of contact 4*v*38 and relay 4A is operatively connected by closure of contact 4*v*39 (see circuits 42 and 55). Relay 4U*a* is connected to the conductor *d*203 by way of contact 4*v*49. However, relay 4U*a* cannot energize, since relay 3U is in the feed transmission energized and ground is accordingly disconnected from the conductor *d*203 due to opening of contact 3*u*92 (see circuit 56).

Relay 4C is disconnected by the opening of contact 4*v*108 (see circuit 44) and restores since the circuit 57 is not closed by way of contact 4*ua*109. Responsive to release of the test relay 4P, winding II of relay 4A is disconnected but relay 4A as already mentioned remains actuated over its winding I in the circuit 55. As soon as relay 4C restores, relay 4U*b* is connected over its winding II:

(67) +, 4*a*57, 4U*b*II, 4*c*104, 4*v*107, —

The third step of each decade is marked by connecting voltage thereto over contact 4*ub*135 and the contact pyramid of the counting relay chain:

(68) —, W*i*110, 4*s*122, 4*t*129, 4*r*125, 4*w*124, 4*ub*135, step 3 of each decade.

Relay 4D is switched in over contacts 4*ub*66 and 4*t*69:

(69) +, 4*t*69, 4D, G*r*130, 4*ub*66, —

Relay 4D closes over contact 4*d*70 a holding circuit for relay 4U*b* by way of its winding I:

(70) +, 4*d*70, 4U*b*I, 4*ub*66, —

The field coils 4M*a* and 4M*b* of the connector are connected for operation upon closure of contact 4*d*62 (see circuits 59 and 60). As already explained, alternate energization of the two field coils will impart rotation to the switch wipers. As soon as the test wiper d413 has reached the third step in the third decade, the test relay 4P will energize in accordance with circuits 61 and 68. The circuit 61 was closed upon energization of relay 4D by way of its contact 4d42. Upon energization of test relay 4P the field coils 4Ma and 4Mb are simultaneously energized by way of contact 4p60 (see circuit 63). The operation of the switch is stopped and the wipers thereof remain on the step reached. Responsive to energization of test relay 4P, the winding I of relay 4A is short circuited by way of contacts 4p44 and 4d40, causing relay 4A to release with some delay.

Responsive to delayed release of relay 4A, ground is placed by contact 4a56 on the conductor d203, thereby closing a circuit for the energization of the seizure relay 3C in the feed transmission 3SpUe:

(71) +, 4a56, 4v53, 4ub52, 4d47, 4n23-wiper, 4cg6, conductor d203, 3u82, 3c84, 3CII, —

Relay 3C is held over the conductor c122 independently of its energizing circuit:

(72) +, . . . , conductor c122, 3CI, 3c83, 3CII, —

The energizing circuit 71 is at the same time interrupted by the opening of contact 3c84.

In the setting set of the connector, the holding circuit for the relays of the counting chain had been interrupted upon release of relay 4A due to opening of contact 4a57, and relays 4R, 4H and 4T are accordingly restored. Opening of contacts 4t129 and 4r125 interrupts the circuit 68, causing release of relay 4P. Opening of contact 4t69 interrupts the holding circuit 69 for relay 4D and this relay releases with some delay. Relay 4P upon releasing disconnects ground from the conductor a200 by opening its contact 4p44. Relay 4D, upon releasing with delay, opens its contact 4d62, thereby disconnecting the energizing circuit for the two field coils 4Ma and 4Mb of the conductor. Opening of contact 4d70 interrupts the holding circuit 70 for relay 4Ub which restores with delay. During the release interval of relay 4Ub, a circuit is closed for the energization of the seizure relay 4Cg of the connector:

(73) +, 4a56, 4v53, 4ub52, 4d48, 4n24-wiper, 4CgII, —

The setting set is responsive to delay release of relay 5Ub again at normal and ready for use in the extension of another call.

In the connector, the conductor d203 had been connected with the test wiper c412 upon energization of the seizure relay 4Cg. The winding I of the seizure relay 4Cg and the winding of the line wiper control magnet 4Ad are now connected with the conductor c202 by way of contact 4cg1. Opening of contact 4cg4 interrupts the start circuit 36.

In the feed transmission, the energizing circuit for the toll identifying relay (see circuit 65) had been interrupted by the opening of contact 3c17 responsive to energization of the seizure relay 3C. Upon closure of contact 3c5, voltage will be on the conductor a120 by way of winding I of relay 3E, and relay 1D (see circuit 21) accordingly energizes in the feed transmission SpUe (FIG. 1) of the calling subscriber:

(74) —, 3z29, 3E1, 3c5, 3UeI, conductor a120, . . . , 1D, —

Relay 3E receives in this circuit insufficient current and cannot energize. The seizure relay 4Cg of the connector is held over its winding I by way of contact 3c52, independently of its energizing circuit 73:

(75) +, 3c52, Wi97, conductor c202, 4cg1, 4CgI, 4Ad,—

The line wiper control magnet 4Ad receives in this circuit insufficient current and therefore cannot energize. Relay 3T is switched in over its winding III by way of contact 3c52:

(76) +, 3c52, 3u65, 3g62, 3TIII, —

The holding circuit 66 for relay 3U is interrupted by the opening of contact 3c90. Relay 3U is after energization of relay 3T and prior to completing its delayed release, again energized over its winding I:

(77) +, 3u16, 3c18, 3UI, 3t13, —

Responsive to energization of relay 3T, relay 3G is switched in over its winding I:

(78) +, 3c52, 3u66, 3t69, 3GI, —

Relay 3G, by opening its contact 3g62, interrupts the holding circuit 76 for relay 3T and the latter deenergizes with delay. Actuation of contact 3g77 completes a circuit for the test relay 3P:

(79) +, 3u16, 3c18, 3g77, 3PII, 3t81, 3PI, conductor d203, 4cg7, c412-wiper, . . . , (line circuit of the called subscriber)

If the line of the called subscriber is idle, test relay 3P will energize in circuit 79 during the release interval of relay 3T and, by closing its contact 3p38, reconnects relay 3T in series with relay 4R:

(80)

$$+,\ 3c52,\ 3TII,\ \frac{3TI}{HL42},\ 3t41,\ 3p38,\ 3RI,\ 3z36,\ 3a33,\ -$$

The thermistor HL42 which is in parallel to the winding I of relay 3T has normally a high resistance and the low resistance winding II of relay 3T will accordingly receive insufficient current. When the thermistor HL42 is traversed by current, its resistance will steadily decrease until the energization of windings I and II is equalized when relay 3T is caused to release by opposed energization. It may be mentioned at this point that windings I and II are connected in opposing sense. The time constant of the thermistor limits the duration of the first ring.

The resistor Wi97 included in the circuit 75 is after closure of contact 3p95 short circuited over such contact and contact 3a96, thereby causing energization of the line wiper control magnet 4Ad of the connector. The line loop in the energization circuit for relay 3A is prepared by way of contacts 3p7 and 3p12:

(81) +, 3p12, 3a10, conductor b201, b411-wiper, subscribers' line loop, a410-wiper, conductor a200, 3AI, 3p7, 3r8, —

Relay 3U and test relay 3P are after closure of contact 3p54 held in the circuit:

(82) +, 3c52, 3z53, 3UII, 3PIII, 3p54, —

Responsive to energization of the ring control relay 3R in circuit 80, voltage is disconnected from the a200-conductor by the opening of contact 3r8 and alternating ringing current RW is instead connected by way of contact 3r9 for the ringing on the called line. During the energization of relay 3R, ringing tone FZ is by way of contact 4r48 connected to the winding V of the transformer 3Ue:

(83) +, 3UeV, 3p47, 3r48, FZ

The ringing tone is inductively transmitted from the winding 3UeV to the windings I and II and from there over the conductors a120 and b121 to the calling subscriber. The circuit for relay 3R is interrupted and the first ring concluded after release of relay 3T and consequent opening of contact 3t41. Relay 3R is by way of contact 3t40 connected to a ten-second ringing interrupter 4Sch and thus periodically energized in 10 second intervals, so as to ring the called line:

(84) —, 3a33, 3z36, 3RI, 3p38, 3t40, ringing interrupter 4Sch

Closure of contact 3t56 completes a holding circuit for relay 3P independently of circuit 82:

(85) +, 3c52, 3t56, 3ZI, 3PIII, 3p54, —

Relay 3Z cannot energize in this circuit since it receives insufficient current by way of the low resistance winding II of relay 3U which is in accordance with circuit 82 connected in parallel to the high resistance winding of relay 3Z. Ground potential is by way of contact 3*t*80 directly connected to the conductor *d*203 thus making the called subscribers' line busy:

(86) +, 3*p*79, 3*t*80, 3*a*88, conductor *d*203, 4*cg*7, *c*412-wiper, . . ., called subscribers' line circuit As soon as the called subscriber answers by removing his receiver, the line loop (see circuit 81) is closed and relay 3A energizes. Opening of contact 3*a*10 connects winding II of relay 3A in the circuit 81. The conductor *b*201 is over contact 3*a*11 connected with the winding IV of the transformer 3U*e* and the line conductors are thus connected through by way of the transformer. Opening of contact 3*a*33 interrupts the energization circuit 84 for relay 3R preventing further energization thereof. Opening of contact 3*a*88 connects the winding II of relay 3Z in the circuit 86 and relay 3Z energizes. Opening of contact 3*a*96 connects the parallel disposed resistors W*i*97 and W*i*98 in the holding circuit 75 for relay 4C*g* and the line wiper control magnet 4A*d* so as to save current. Opening of contact 3*z*53 disconnects the winding II of relay 3U in the circuit 82, causing relay 3U to restore.

Relay 3Z is now held over its winding I (see circuit 85) independently of its energizing circuit. Upon delayed release of 3U, relay 3G is disconnected by the opening of contact 3*u*66 (see circuit 78). Upon release, relay 3G connects over its contact 3*g*20 voltage to the conductor *b*121:

(87) —, 3*f*24, 3*z*23, 3*g*20, D*r*2, 3U*e*II, conductor *b*121, . . .

The feed transmission is after release of relay 3G in condition to permit the two subscribers to converse with each other.

Assuming that the called subscriber is the first to restore his receiver at the completion of the conversation, whereupon the calling subscriber hangs up, ground will be disconnected from the conductor *c*122, interrupting the holding circuit for relay 3C (see circuit 72) and thus causing relay 3C to release. Relay 3C by opening its contact 3*c*52 interrupts the holding circuits for relays 3P and 3Z (see circuit 85) and for the seizure relay 4*cg* as well as for the line wiper control magnet 4A*d* in the connector (see circuit 75). Relay 3Z is still being held over its winding II and conductor *d*203 until the corresponding circuit is interrupted at contact 3*p*79 responsive to restoration of relay 3P (see circuit 86). Upon release of relay 3Z, the feed transmission 3S*p*U*e* will be at normal and in readiness for further seizure by a preceding connection device.

However, if the calling subscriber should be the first to restore his receiver, seizure relay 3C will be caused to restore due to disconnection of ground from the conductor *c*122. Upon opening contact 3*c*52, the test relay 3P and relay 3Z will be held operated in the circuit:

(88) +, 3*a*57, 5*z*58, 3*t*56, 3ZI, 3PIII, 3*p*54, —

The seizure relay 4C*g* of the connector is after opening of contact 3*c*52 held operated by way of contacts 3*a*57, 3*z*58 and conductor *c*202 (see circuit 75).

When the line loop (see circuit 81) is interrupted responsive to restoration of the receiver by the called subscriber, battery feed relay 3A will deenergize and will interrupt the holding circuits for relays 3P, 3Z and for the seizure relay 3C*g* of the connector, by opening its contact 3*a*57. Upon restoration of these relays, the feed transmission 3S*p*U*e* and the connector 4LW will again be at rest and ready for seizure by a preceding connection device.

In the event that the called subscriber is busy, the test relay 3P cannot energize in circuit 79 within the release interval of relay 3T. After restoration of relay 3T, relay 3U will be disconnected by the opening of contact 3*t*13 (see circuit 77). Owing to its slow-to-release feature, relay 3U releases with delay and by opening its contact 3*u*66 interrupts the holding circuit for relay 3G (see circuit 78). However, relay 3G is being held operated over its winding I in the circuit:

(89) +, 3*c*52, 3*z*53, G*r*68, 3*g*72, 3*f*70, 3GI, —

Since relay 3P is not energized, busy tone is over its contact 3*p*46 connected to the winding CU*e*V of the transformer:

(90) +, 3U*e*V, 3*p*46, 3*r*44, 3*g*43, BZ

The busy tone is inductively transmitted from the winding of the transformer 3U*e*V to the windings I and II and from there to the calling subscriber. When the calling subscriber thereupon replaces the receiver, ground potential is disconnected from the conductor *c*122 and the seizure relay 3C releases, since its holding circuit 72 is interrupted. Opening of contact 3*c*52 interrupts the holding circuit for relay 3G (see circuit 78), and relay 3G restores. Upon restoration of relay 3G, the busy tone is disconnected due to opening of contact 3*g*43 (see circuit 90). The feed transmission is after release of relay 3G at normal and in readiness for seizure in the extension of another call.

Changes may be made within the scope and spirit of the appended claims which define what is believed to be new and desired to have protected by Letters Patent.

I claim:

1. A circuit arrangement for use in a telephone system and the like, for testing a called subscriber's line in the extension of a connection thereto by a connector and for connecting battery feed thereto, comprising a battery feed transmission device disposed ahead of the connector and containing switching means for the testing of a called subscriber's line and for connecting battery feed thereto, a seizure relay operatively associated with said feed transmission device, circuit means effective responsive to the setting of the wipers of said connector to a predetermined bank contact group by a first impulse series for preparing an energizing circuit for said seizure relay, and means for operatively closing said energizing circuit responsive to the setting of the wipers of said connector relative to the bank contacts of a predetermined subscriber line determined by a second impulse series.

2. A circuit arrangement according to claim 1, comprising a setting set common to a plurality of connectors and containing a slow-to-release relay which is energized during the receipt of the impulse series denoting the tens digit, a switch-over relay disposed in said feed transmission device, said slow-to-release relay being effective upon the release thereof at the conclusion of said impulse series to close an actuating circuit for said switch-over relay, said switch-over relay completing a holding circuit for itself and simultaneously interrupting its energizing circuit.

3. A switching arrangement according to claim 1, comprising a slow-to-release relay for limiting the testing time interval, a testing relay, a control relay, means controlled by said seizure relay for operatively connecting said slow-to-release relay, and means governed by said slow-to-release relay for causing energization of said control relay for operatively connecting said testing relay.

4. A circuit arrangement according to claim 3, comprising means governed by said control relay for closing the energizing circuit for said testing relay and for interrupting the circuit for said slow-to-release relay to cause operative actuation of said testing relay during the release interval of said slow-to-release relay in the event test of such subscriber line shows it to be idle.

5. A circuit arrangement according to claim 4, wherein said testing relay is operative to effect transmission of busy tone to the calling subscriber in the event test of such called subscriber line shows it to be busy.

6. A circuit arrangement according to claim 4, comprising a ringing relay, and circuit means effective upon energization of said testing relay for causing operative actuation of said slow-to-release relay in series with said ringing relay.

7. A circuit arrangement according to claim 6, wherein said slow-to-release relay has two oppositely effective windings, means controlled by said testing relay for operatively connecting said windings, a thermistor the resistance of which increases after operative connection thereof for short circuiting one of said windings for the purpose of causing restoration of said slow-to-release relay responsive to equal energization of the two windings thereof.

References Cited in the file of this patent

UNITED STATES PATENTS 1,660,975 Quass ---------------- Feb. 28, 1928